United States Patent [19]
Carroll

[11] 3,906,522
[45] Sept. 16, 1975

[54] NON-CONTACT PHOTOGRAPHIC IDENTIFICATION DEVICE FOR LABELING GAMMA CAMERA IMAGES

[75] Inventor: Robert G. Carroll, Pittsburgh, Pa.

[73] Assignee: The United States of America as represented by the Secretary of Health, Education and Welfare, Washington, D.C.

[22] Filed: Feb. 8, 1973

[21] Appl. No.: 330,647

[52] U.S. Cl. .............................................. 354/105
[51] Int. Cl. .......................................... G03b 17/24
[58] Field of Search .......... 95/1.1; 346/110; 250/67; 354/105

[56] References Cited
UNITED STATES PATENTS

| | | |
|---|---|---|
| 1,358,990 | 11/1920 | Scannell ................................ 95/1.1 |
| 2,602,369 | 7/1952 | Tuttle ..................................... 95/1.1 |
| 2,751,275 | 6/1956 | Mansberg ............................ 346/110 |
| 2,866,395 | 12/1958 | Manning .............................. 354/105 |
| 3,488,753 | 1/1970 | Tone ..................................... 250/67 |

Primary Examiner—John M. Horan

[57] ABSTRACT

A non-contact photographic identification device for labeling gamma camera images comprises a phosphor coated identification carrier, and a means for positioning the identification carrier adjacent the face of a cathode ray tube. The device allows various identifying legends and cathode ray tube images to be simultaneously focused and recorded on the film of an unmodified conventional or Polaroid camera.

6 Claims, 8 Drawing Figures

PATENTED SEP 16 1975 3,906,522
SHEET 1 OF 2
FIG. 1
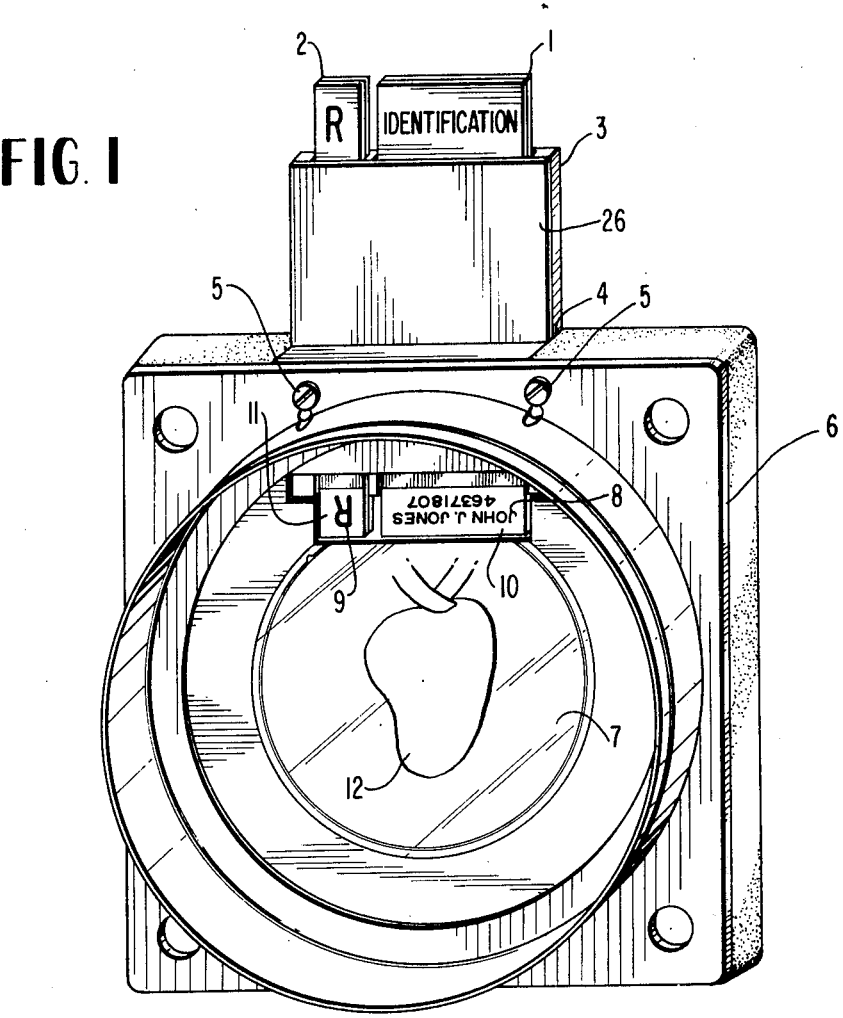
FIG. 2
FIG. 3
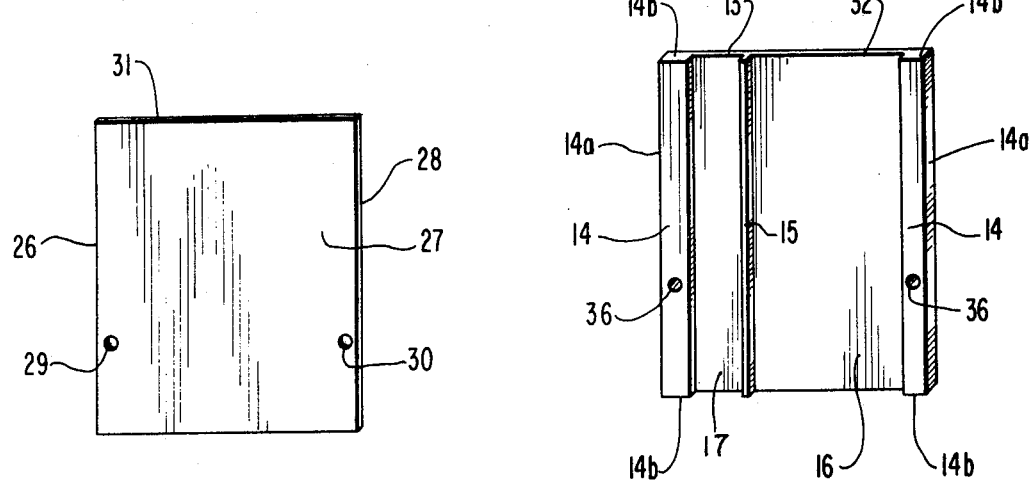

NON-CONTACT PHOTOGRAPHIC IDENTIFICATION DEVICE FOR LABELING GAMMA CAMERA IMAGES

FIELD OF THE INVENTION

The present invention relates to a non-contact photographic identification device and, more pertinently, to such a device for labeling gamma camera images which permits certain identifying legends and cathode ray tube images to be recorded on the film of an unmodified conventional or Polaroid camera.

BACKGROUND OF THE INVENTION

Prior art photographic identification devices which employ indicia carrying phosphorescent or luminescent material transfer the identifying legends to the photographic or X-ray film in one of two ways. One method consists of placing the identifying legend in contact with the photographic or X-ray film and transferring the data to the film by exposing it to the X-rays.

The other method consists of the use of a modified camera containing a phosphorescent or luminescent marking device which transfers the identifying legend to the photographic film. An alternate of this method consists of using a modified camera comprising two lenses, one focusing on the identifying legend and the other on the subject.

The major problem with these prior methods is that they necessitate extensive and costly camera modifications. Furthermore, in some instances the handling of film is complicated, thereby causing slower operation than desirable and occasional imperfect results which necessitate repeating the nuclear medicine or X-ray procedure.

SUMMARY OF THE INVENTION

The shortcomings of the prior art photographic identification devices which employ phosphorescent or luminescent material are satisfactorily overcome by the present invention. An object of the present invention is thus to overcome the defects of the prior art such as indicated above.

Another object of the present invention is to provide for improved radionuclide scan and X-ray identification.

Another object of the present invention is to provide a non-contact photographic identification device for labeling gamma camera images utilizing an unmodified camera.

Another object is to provide a non-contact photographic identification device which can be adapted for use with a cathode ray tube oscilloscope.

A further object is the positive provision of desired data, e.g., the patient, doctor, date, or hospital, in the identification of medical X-rays and scans.

Yet another object is the prevention of mistakes from electronic mirror imaging in identifying scans and X-rays, such as a film which looks like a left lateral but is actually a right lateral, by providing for the positive identification of the view, such as right, left, anterior or posterior.

A still further object is the prevention of errors from reading the wrong side of 35 mm. or 70 mm. transparencies.

In furtherance of these and other objects, a principal feature of the present invention is a photographic identification device comprising a phosphorescent, luminescent or fluorescent background. Another feature of the invention is its easy adaptation for use in conjunction with a cathode ray tube oscilloscope or similar device through the minor modification of the oscilloscope bezel. Thus, any unmodified, conventional camera which can focus on the cathode ray tube is provided with photographic identification capability.

BRIEF DESCRIPTION OF THE DRAWING

FIG. 1 is a front perspective view of an embodiment of a photographic identification device as adapted for use in conjunction with a cathode ray tube.

FIG. 2 is a front perspective view of a cover plate for a slide holder.

FIG. 3 is a front perspective view of the slide holder.

Figure 4:
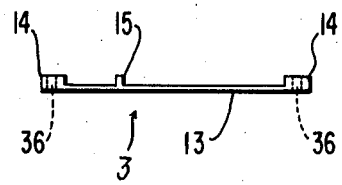
FIG. 4 is an end elevational view of the same slide holder shown in FIG. 3.
Figure 5:
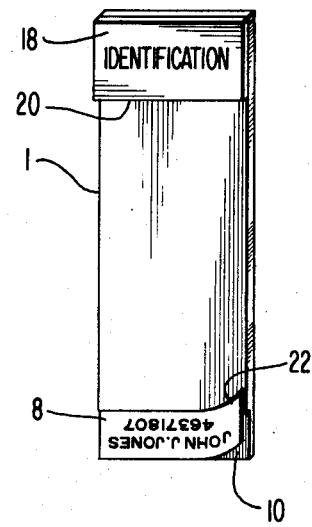
FIG. 5 is a front perspective view of an identification slide for use in conjunction with the slide holder and cover plate of FIGS. 2-4.
Figure 7:
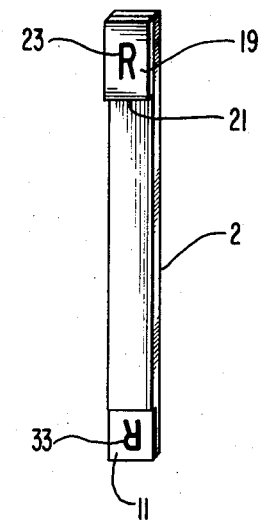
FIG. 7 is a front perspective view of a patient position slide.
Figure 6:
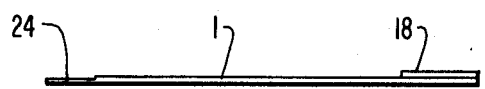
FIG. 6 is a side elevational view of the identification slide shown in FIG. 5.
Figure 8:
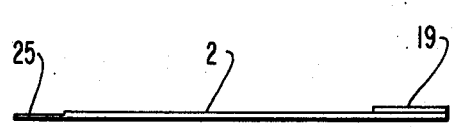
FIG. 8 is a side elevational view of the patient position slide shown in FIG. 7.

For a better understanding of the invention a possible embodiment thereof will now be described with reference to the attached drawing, it being understood that this embodiment is to be intended as merely exemplary and in no way limitative.

DETAILED DESCRIPTION

Referring to FIG. 1, there is shown an identification carrier positioning means, here provided in the form of a two track slide holder 3 and coverplate 26 both extending downwardly through a slot 4 in the bezel 6 of a cathode ray tube 7 and securely fastened thereto by screws 5. An identification carrier means, here provided in the form of a pair of slide elements 1 and 2, having a phosphorescent background or the like, are received in the slide holder 3. The identifying information 8 including patient name and date as well as any other pertinent identification information, such as the doctor's name or hospital, and patient position information 9 are written respectively on the phosphorescent backgrounds 10 and 11 of the identification slide 1 and patient position slide 2. The slides 1 and 2 are vertically slideable in and removable from the slide holder 3 so as to position the identifying information 8 and 9, carried on the phosphorescent backgrounds 10 and 11 of the slides 1 and 2, adjacent to the face of the cathode ray tube 7, which, for the purpose of this description is displaying the image of an human organ 12.

Referring now to FIG. 2, the cover plate 26 comprises two planar surfaces 27 and 28, an upper edge 31, and two rearwardly extending apertures 29 and 30 for the reception of screws 5 (See: FIG. 1). The apertures are positioned such that when the cover plate 26 is fastened to the oscilloscope bezel 6 and the slide holder 3 the upper edge 31 of the cover plate 26 is approximately flush with the upper edge 32 of the slide holder 3. The width and length of the cover plate 26 are approximately equal to the width and length of the slide holder 3 which is described below.

Referring now to FIGS. 3-4, the two track slide holder 3 comprises a planar rear surface 13, side flanges 14 positioned on both sides of the rear planar surface 13 and extending forwardly therefrom, and at substantially a right angle thereto, and a central flange 15 positioned between the two side flanges 14 and extending forwardly from and at a substantially right angle to the rear planar surface 13.

The position of the central flange 15 in relation to the side flanges 14 is governed by the respective widths of the identification slide 1 and the patient position slide 2 (See: FIGS. 5-8). The overall width of the slide holder 3 is slightly greater than the total width of the identification slide 1, patient position slide 2, central flange 15 and the side flanges 14. The central flange and the two side flanges 14 form separate and substantially parallel trackways 16 and 17 for the reception of the appropriate identification slide 1 and patient position slide 2, respectively. The depth of the trackways 16 and 17 is slightly greater than the thickness of the of the identification slide 1 and the patient position slide 2 so as to insure a sliding fit.

Each side flange 14 is provided with a rearwardly extending aperture 36 for the reception of screws 5 (See: FIG. 1). The apertures 36,36 are located approximately midway the sides 14a and the ends 14b of the side flanges 14.

Referring now to FIGS. 5-8, the identification slide 1 is provided with a plastic card 18 which is permanently affixed to the upper portion of the front surface thereof. The legend "IDENTIFICATION" is inscribed on the plastic card 18.

The front surface of the patient position slide 2 is also provided with a permanently affixed plastic card 19 at its uppermost end. Inscribed on the plastic card 19 is the letter 23 corresponding to the appropriate position of the patient during the procedure, such as R, L, A, or P; this letter 33 is also carried on the phosphorescent background 11 at the lower end of the front surface of the patient position slide 2.

The plastic cards 18 and 19 protrude from the substantially flat front surface respectively of the identification slide 1 and the patient position slide 2 in such a manner that, when the slides are disposed within the trackways 16 and 17 of the slide holder 3, the lower edges 20 and 21 of the plastic cards 18 and 19 will make contact with the upper edge 31 of the cover plate 26, thereby acting as a stop.

In the preferred form, the identification slides 1 and 2, with their phosphorescent surfaces, are adapted to receive over such surfaces suitable transparent adhesive tape on which the desired indicia 8 and 9 may be written; such tape is readily available commercially and one example is sold under the name of "Scotch Magic Tape."

The lower portion of the front surface of the identification slide 1 and the patient position slide 2 are sufficiently recessed so that when the transparent adhesive 22 or the rub-on patient position indicia 33 are applied over the respective permanently affixed phosphorescent backgrounds 10 and 11 the total thickness of the recessed portion of the slides and the transparent adhesive 22 or the rub-on indicia 33 is not greater than the normal thickness of the slides 1 and 2 at their non-recessed mid portions. The recessed lower portion assures the easy insertion of the slides 1 and 2 into the appropriate trackways 16 and 17 of the slide holder 3.

The slides 1 and 2 are of such a length that, when disposed within the slide holder 3 in the manner described above, their lower recessed portions 24 and 25 which carry the phosphorescent backgrounds 10 and 11 and the appropriate identifying information will extend sufficiently beyond the lower most edge of the slide holder 3 and the cover plate 26 so that the identifying information will be visibly disposed adjacent the image 12 displayed on the face of the cathode ray tube 7 (See: FIG. 1).

The slides 1 and 2, slide holder 3, and cover plate 26 may be manufactured out of black anodized aluminum; however, it should be noted that any other material may also be employed.

In operation, the appropriate patient position slide 2 which is permanently marked with rub-on indicia 33 on its phosphorescent background 11 is disposed within the trackway 17 of the slide holder 3. Then the identification slide 1, which may display the patient's name, date and hospital or any other pertinent identifying information, is disposed within trackway 16 of the slide holder 3. The identifying information is printed with a black pen onto the transparent adhesive tape 22, which overlays the phosphorescent background 10.

Since the opaque lettering of the identifying information and the rub-on indicia block light transmission from the underlying phosphorescent background, a negative image of the information is displayed (See: FIG. 1).

After the picture of the cathode ray tube image and the identifying information has been taken, the slides 1 and 2 may be removed from the slide holder 3 and the transparent adhesive tape 22 having such patient's descriptive indicia thereon may be removed and discarded, and then replaced with fresh tape for the next patient; maintaining tape over the phosphor at all times also tends to prevent discoloration of such phosphor. An alternate method of displaying the identifying information is to write the identifying information with a phosphorescent material, e.g., a phosphorescent ink, on a plain card which may be subsequently attached to the identification slide 1 by any suitable means.

The phosphorescent background, which may be provided in the form of a phosphorescent tape, produces a high initial luminosity and a long lower intensity afterglow. The intensity of the phosphorescent background may be regulated by regulating the ambient light shining upon the phosphorescent background when the slides are not in use. Fluorescent light maximally excites the phosphor and results in brighter images than when incandescent light is used.

If the slides are left on a table top exposed to ambient light, a satisfactory image is usually obtained by inserting the slides into the holder at the time the image starts, and removing it after the image is completed. However, if the phosphor is activated by close contact with a fluorescent bulb, the phosphor will emit enough light to produce adequate exposure on one second or longer duration rapid sequence scintiphotos to a total of 10 or 12 frames.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the disclosed embodiment.

It should be noted that the identification device is not limited to the labeling of human organ images. The device may be used to label any image which can be displayed on the face of a cathode ray tube or other similar device, such as a power output graph or temperature gradient.

Also, the positioning means and the identification carrier need not be in the nature of a trackway and a slide. Any other suitable method for removably mounting an identification carrier adjacent the face of the cathode ray tube, such as by the use of snaps, screws or adhesives, may also be employed without departing from the generic inventive concepts of the present device.

It is to be understood that the phraseology or terminology employed herein is for the purposes of description and not of limitation.

What is claimed is:

1. A light-tight non-contact photographic identification device for labeling gamma camera or other cathode ray tube images as displayed on the face of a cathode ray tube device upon being photographed on film by a conventional camera, comprising:

indicia means for identifying the image displayed on the face of the cathode ray tube, wherein said indicia means is contained within substantially the same focal plane as the gamma camera or other cathode ray tube image, said indicia means further including removably engageable slide means for view identifying and for identification, said view identifying and identification slide means being permanently marked with appropriate opaque position identifying letters and with a removable adhesive comprising opaque identifying legends and comprising the name of the patient or subject;

self-luminous means for producing the necessary light to imprint the film with the image of said indicia means simultaneously with the activation of said self-luminous means, wherein said self-luminous means is contained within substantially the same focal plane as the gamma camera or other cathode ray tube image; and positioning means contained within substantially the same plane as the face of a cathode ray tube for positioning said indicia means and said self-luminous means adjacent the face of the cathode ray tube in substantially the same plane as the face of the cathode ray tube, whereby the imprinting of the film with the image of said indicia means simultaneously with the activation of said self-luminous means eliminates mislabeling of the gamma camera or other cathode ray tube image, caused by double handling and successive exposure.

2. The device of claim 1, wherein said positioning means comprises at least one trackway which communicates with the face of the cathode ray tube, and said indicia means comprising said removably engageable slide means is slidably engageable with and removable from said trackway.

3. The device of claim 2 comprising two said trackways and wherein said slide means comprises a view identifying slide and an identification slide, wherein one of said trackwyas accommodates said view identifying slide and another of said trackways accomodates said identification slide comprising the name of the patient or subject.

4. The device of claim 1, wherein said self-luminous means is in the form of a background of phosphorescent, fluorescent or luminescent material, and said indicia means is in the form of an opaque foreground.

5. The device of claim 1, wherein said self-luminous means is in the form of a background of phosphorescent, fluorescent, or luminescent material, and said indicia means is in the form of a partially opaque foreground.

6. The device of claim 1 wherein said self-luminous means is in the form of a foreground of phosphorescent, fluorescent or luminescent material, and said indicia means is in the form of an opaque background.

* * * * *